(12) United States Patent
Wang

(10) Patent No.: US 12,228,181 B2
(45) Date of Patent: Feb. 18, 2025

(54) DISC BRAKE PISTON RETRACTION TOOL

(71) Applicant: Tian Shoei Wang, Taichung (TW)

(72) Inventor: Tian Shoei Wang, Taichung (TW)

( * ) Notice: Subject to any disclaimer, the term of this patent is extended or adjusted under 35 U.S.C. 154(b) by 246 days.

(21) Appl. No.: 18/162,727

(22) Filed: Feb. 1, 2023

(65) Prior Publication Data

US 2023/0184302 A1 Jun. 15, 2023

(51) Int. Cl.
*F16D 65/00* (2006.01)
*B25B 27/00* (2006.01)

(52) U.S. Cl.
CPC ...... *F16D 65/0043* (2013.01); *B25B 27/0035* (2013.01)

(58) Field of Classification Search
CPC ..... F16D 65/00; F16D 65/0043; B25B 27/00; B25B 27/0035
See application file for complete search history.

(56) References Cited

U.S. PATENT DOCUMENTS

| | | | | |
|---|---|---|---|---|
| 8,826,504 | B1* | 9/2014 | Slivon | B25B 27/0035 29/244 |
| 9,981,368 | B2* | 5/2018 | Zeren | B25B 27/28 |
| 10,156,273 | B1* | 12/2018 | Huang | F16D 65/0043 |
| 11,067,142 | B2* | 7/2021 | Tseng | F16D 65/0043 |
| 11,261,926 | B1* | 3/2022 | Kuzmic | B60T 17/221 |
| 11,391,334 | B2* | 7/2022 | Dahl | F16D 65/0043 |
| 11,408,472 | B2* | 8/2022 | Wang | B25B 27/0035 |
| 2023/0184302 | A1* | 6/2023 | Wang | B25B 27/0035 81/485 |

* cited by examiner

*Primary Examiner* — Lee D Wilson

(57) ABSTRACT

A piston retraction tool is provided. The tool can be operated with one hand. When an operating handle is operated, the helical movements of a first external thread and a second external thread drive a first pressure plate and a second pressure plate to extend and move away from each other. First engaging pieces of first L-shaped elastic plates and second engaging pieces of second L-shaped elastic plates are distributed in the roots and on the crests of the first and second external threads. The helical movements of the first and second external threads don't interfere with each other because the first and second engaging pieces of the first and second L-shaped elastic plates are configured to jump along the first and second external threads independently. The helical movements of the first and second external threads will not be locked.

10 Claims, 16 Drawing Sheets

DISC BRAKE PISTON RETRACTION TOOL

FIELD OF THE INVENTION

The invention relates to a disc brake piston retraction tool. The tool can be operated with one hand. When an operating handle is operated, the helical movements of a first external thread and a second external thread drive a first pressure plate and a second pressure plate to extend and move away from each other. The helical movements of the first external thread and the second external thread won't be locked, which improves the drive reliability.

BACKGROUND OF THE INVENTION

In general, auto mechanics responsible for repairing disc brakes and replacing brake pads may use various press machine tools. For these press machine tools, one difficulty is the need for professional mechanical use capabilities to achieve the retraction of one or more pistons associated with the caliper housing. Therefore, for brake repair and brake pad replacement, there is a need to operate an easy-to-use tool for retraction of one or more pistons.

There is a conventional art about a disc brake piston retractor tool. In the conventional art, the spacer bar of the reversible ratchet wrench assembly is simply pulled back and forth to push the piston back into the cylinder. However, when the spacer bar is pulled back, the coupler is not restricted from rotating reversely. When the second pressure plate is not tightly pressed against the piston, there will be a problem that the ratchet wheel is rotated reversely when the spacer bar is pulled back. Referring to FIG. 1 and FIG. 2, when the handle 1 (equivalent to the spacer bar) is pulled back, the spring 11 pushes the plunger pin 12 against the surface of the nose 130 of the pawl 13. Because the claw 131 is maintained at the position of the notch 140 of the ratchet wheel 14, it still has a certain engaging force. Since the coupler 15 that is coaxially connected with the ratchet wheel 14 is not restricted from rotating reversely, the coupler 15 is easy to rotate reversely when the handle 1 is pulled back. In the case that the coupler 15 is rotated reversely, the pressure plate 17 screwed to the coupler 15 through the stud 16 may be retracted or tilted when the handle 1 is pulled back. In practice, the operator needs to hold the pressure plate 17 with the other hand to avoid this situation, but this affects the operational convenience and use of the tool.

Another conventional art is about a disc brake piston retraction tool, which can overcome the deficiency of the above-mentioned conventional tool. However, the engaging notches of the first L-shaped elastic plate of the first buckle member and the second L-shaped elastic plate of the second buckle member are pressed against the external threads. Because the engaging notches cover a plurality of roots and crests of the external threads, the first L-shaped elastic plate and/or the second L-shaped elastic plate may jump on the external threads too slowly, and the helical motion may be locked. Accordingly, the present inventor has devoted himself based on his many years of practical experiences to solve these problems.

SUMMARY OF THE INVENTION

The primary object of the invention is to provide a disc brake piston retraction tool, comprising a reversible ratchet wrench, a first pressure plate assembly, and a second pressure assembly.

The reversible ratchet wrench includes an operating handle and a ratchet wheel located at a force output end of the operating handle. A first force output shaft and a second force output shaft are disposed on two sides of a center of the ratchet wheel and extend out of two sides of the force output end of the operating handle. A surface of the first force output shaft is formed with a first external thread. A surface of the second force output shaft is formed with a second external thread. The first external thread and the second external thread are in different helical directions.

The first pressure plate assembly includes a first pressure plate, a first nut, a first sleeve unit, and a first restraining member. The first pressure plate has an outer surface and an inner surface. The first nut is fixed to the inner surface of the first pressure plate relative to the first force output shaft. The first nut has a first internal screw hole screwed with the first external thread. The first sleeve unit is made of an elastic material and sleeved on an outer surface of the first nut. A front edge of one end of the first sleeve unit has a plurality of first L-shaped elastic plates that are arranged around the first internal screw hole and extend toward the surface of the first force output shaft. The first L-shaped elastic plates each have a first engaging piece corresponding to the first external thread. The first engaging piece is engagable in a root of the first external thread. The first engaging piece has a width not more than 4 times a pitch of the first external thread. The first engaging piece has a thickness less than half of the pitch of the first external thread. The first engaging piece is configured to jump along the first external thread to generate a pressing force. The first restraining member is sleeved on a surface of the first sleeve unit for restraining the first sleeve unit on the first nut.

The second pressure plate assembly includes a second pressure plate, a second nut, a second sleeve unit, and a second restraining member. The second pressure plate has an outer surface and an inner surface. The second nut being fixed to the inner surface of the second pressure plate relative to the second force output shaft. The second nut has a second internal screw hole screwed with the second external thread. The second sleeve unit is made of an elastic material and sleeved on an outer surface of the second nut. A front edge of one end of the second sleeve unit has a plurality of second L-shaped elastic plates that are arranged around the second internal screw hole and extend toward the surface of the second force output shaft. The second L-shaped elastic plates each have a second engaging piece corresponding to the second external thread. The second engaging piece is engagable in a root of the second external thread. The second engaging piece has a width not more than 4 times a pitch of the second external thread. The second engaging piece has a thickness less than half of the pitch of the second external thread. The second engaging piece is configured to jump along the second external thread to generate a pressing force. The second restraining member is sleeved on a surface of the second sleeve unit for restraining the second sleeve unit on the second nut.

When in use, the first pressure plate and the second pressure plate of the tool are placed in an internal space of a caliper housing and located between at least one piston that is not retracted and a fixed wall. The force output direction of the reversible ratchet wrench is selective. The operating handle of the reversible ratchet wrench is pulled back and forth, and then the ratchet wheel drives the first force output shaft and the second force output shaft to rotate in one direction. The helical movements of the first external thread and the second external thread act on the first internal screw hole of the non-rotating first nut and the second inner screw hole of the non-rotating second nut, such that the first pressure plate and the second pressure plate are driven to extend and move away from each other. The fixed wall is configured to confine the movement of the first pressure plate and the second pressure plate and serves as a force support, so that the piston is retracted to the starting position in the cylinder. In the process of retracting the piston, at least one of the first engaging pieces of the first L-shaped elastic plates of the first sleeve unit and at least one of the second engaging pieces of the second L-shaped elastic plates of the second sleeve unit are pressed against the first external thread and the second external thread to provide a damping force to limit rotation of the first force output shaft and the second force output shaft. Thus, when the operating handle of the reversible ratchet wrench is pulled back, it will not drive the ratchet wheel, so that the tool can be operated with one hand. When the operating handle is operated, the helical movements of the first external thread and the second external thread drive the first pressure plate and the second pressure plate to extend and move away from each other. The first engaging pieces of the first L-shaped elastic plates and the second engaging pieces of the second L-shaped elastic plates are distributed in the roots and on the crests of the first external thread and the second external thread. The helical movements of the first external thread and the second external thread don't interfere with each other because the first engaging pieces of the first L-shaped elastic plates and the second engaging pieces of the second L-shaped elastic plates are configured to jump along the first external thread and the second external thread independently. The helical movements of the first external thread and the second external thread won't be locked, which improves the drive reliability.

Preferably, the force output end of the operating handle has an accommodating hole therein. The ratchet wheel and a pawl are pivotally connected in the accommodating hole. The pawl in the accommodating hole is pivotally connected to a side edge of the ratchet wheel via a pivot hole. The pawl has a pair of switching portions that are disposed at two ends of the pivot hole and extend out of the accommodating hole. A nose-shaped protrusion is formed on one side between the pair of switching portions. Two spaced claws each corresponding in shape to a tooth space of the ratchet wheel are formed on another side between the pair of switching portions. One side of the pawl is provided with a spring installed in a long groove to push a stopper against one side of the nose-shaped protrusion so that one of the two claws is engaged with the tooth space of the ratchet wheel. When the operating handle is swung in one direction, one of the claws of the pawl pushes the ratchet wheel to rotate. On the contrary, when the operating handle is swung back, the nose-shaped protrusion presses the stopper into the long groove, so that the claw jumps on the teeth of the ratchet wheel and won't push the ratchet wheel to rotate reversely, thereby achieving the effect of unidirectional rotation of the ratchet wheel. When the operating handle is swung back, the stopper against the surface of the nose-shaped protrusion of the pawl is compressed and it has low resistance and rebounds back in height after being compressed, such that the first engaging pieces of the first sleeve unit and the second engaging pieces of the second sleeve unit are pressed against the first external thread of the first force output shaft and the second external thread of the second force output shaft to provide an anti-rotation effect. Thus, the ratchet wheel won't be pushed to rotate reversely when the operating handle is swung back.

Preferably, two sides of the ratchet wheel are concentrically formed with circular frames. The two sides of the ratchet wheel are pivoted to the force output end of the operating handle via the circular frames. The first force output shaft and the second force output shaft in the circular frames extend from both sides of the ratchet wheel to be out of the two sides of the force output end of the operating handle. The first external thread and the second external thread are screwed with the first nut and the second nut respectively via the largest number of screw threads, so as to increase the effective distance of the helical movement.

Preferably, the first pressure plate and the second pressure plate each have a through screw hole relative to the first force output shaft and the second force output shaft. The first nut and the second nut each have an annular coupling portion with an external thread relative to the through screw hole of the first pressure plate and the through screw hole of the second pressure plate. The coupling portion of the first nut is screwed and fixedly connected to the through screw hole of the first pressure plate by using a hydraulic press machine. The coupling portion of the second nut is screwed and fixedly connected to the through screw hole of the second pressure plate by using the hydraulic press machine. The first pressure plate and the second pressure plate can be concentrically, symmetrically extended away from each other or retracted toward each other.

Preferably, the first nut and the second nut each have a cylindrical surface. The first restraining member and the second restraining member are elastically deformable compression springs. The first sleeve unit is composed of a pair of first semicircular sleeves that are spliced to each other and correspond in diameter and in shape to the first nut. The second sleeve unit is composed of a pair of second semicircular sleeves that are spliced to each other and correspond in diameter and in shape to the second nut. The pair of first semicircular sleeves and the pair of second semicircular sleeves each have at least one slot to form at least one elastic frame side. The first L-shaped elastic plates extend from front edges of the elastic frame sides of the pair of first semicircular sleeves, respectively. The second L-shaped elastic plates extend from front edges of the elastic frame sides of the pair of second semicircular sleeves, respectively. The first restraining member and the second restraining member can be elastically expanded and deformed. The pair of first semicircular sleeves and the pair of second semicircular sleeves are deformed independently of each other, in cooperation with the elastic frame sides each having elastic deformation capacity. When the first external thread and the second external thread perform the helical movements, the first engaging pieces of the first L-shaped elastic plates and the second engaging pieces of the second L-shaped elastic plates react more quickly to the thrust of the helical movements to jump along the first and second external threads.

Preferably, the first nut and the second nut each have a groove around the surfaces of the first nut and the second nut. The pair of first semicircular sleeves and the pair of second semicircular sleeves each have at least one locking piece to be locked in the groove. Through the locking piece to be locked in the groove, the pair of first semicircular sleeves won't displace axially on the first nut. Through the locking piece to be locked in the groove, the pair of second semicircular sleeves won't displace axially on the second nut. When the first engaging pieces of the first L-shaped elastic plates and the second engaging pieces of the second L-shaped elastic plates are pressed against the first external thread and the second external thread to bear the pushing forces of the helical movements, they can jump along the first external thread and the second external thread, respectively.

Preferably, a front section of each of the first nut and the second nut is gradually tapered, so that a gap is defined between the elastic frame sides of the pair of first semicircular sleeves and the front section of the first nut as well as between the elastic frame sides of the pair of second semicircular sleeves and the front section of the second nut. Through the gap, the first restraining member is sleeved on part of the pair of first semicircular sleeves, and the second restraining member is sleeved on part of the pair of second semicircular sleeves. This can prevent the elastic frame side from being bound or pressed to affect its deformation.

Preferably, two first L-shaped elastic plates extend from each of the front edges of the elastic frame sides of the pair of first semicircular sleeves, and two second L-shaped elastic plates extend from each of the front edges of the elastic frame sides of the pair of second semicircular sleeves. The four first L-shaped elastic plates are spaced apart from each other around the first force output shaft. Preferably, the four first L-shaped elastic plates are spaced at equal intervals around the first force output shaft. The four second L-shaped elastic plates are spaced apart from each other around the second force output shaft. Preferably, the four second L-shaped elastic plates are spaced at equal intervals around the second force output shaft. The first engaging pieces of the four first L-shaped elastic plates are distributed in different positions of the roots and the crests of the first external thread in the helical movements. The second engaging pieces of the four second L-shaped elastic plates are distributed in different positions of the roots and the crests of the second external thread in the helical movement. When the first external thread and the second external thread perform the helical movements, each of the first engaging pieces and each of the second engaging pieces jump to pass through the crests of the first and second external threads at different timings, so that the helical movements won't be locked. When the operating handle is swung back, the first force output shaft and the second force output shaft won't be driven to rotate.

Preferably, the first external thread and the second external thread have the same pitch. The first engaging pieces of the first L-shaped elastic plates and the second engaging pieces of the second L-shaped elastic plates each correspond to the pitch and a depth of the first external thread and the second external thread and have a width that is 2 to 3 times the pitch and a thickness that is one quarter to one third of the pitch. The first engaging pieces and the second engaging pieces are square pieces and each have a bottom end extending downward about half to two-thirds of the depth of the first external thread and the second external thread. By setting the size conditions of the first engaging pieces and the second engaging pieces, the first engaging pieces and the second engaging pieces will not be excessively twisted and deformed when pushed by the first and second external threads.

DESCRIPTION OF THE PREFERRED EMBODIMENTS

Referring to FIGS. 3 to 18, a disc brake piston retraction tool 20 of the invention is shown. The tool 20 comprises a reversible ratchet wrench 30, a first pressure plate assembly 40, and a second pressure assembly 50.

Figure 1:
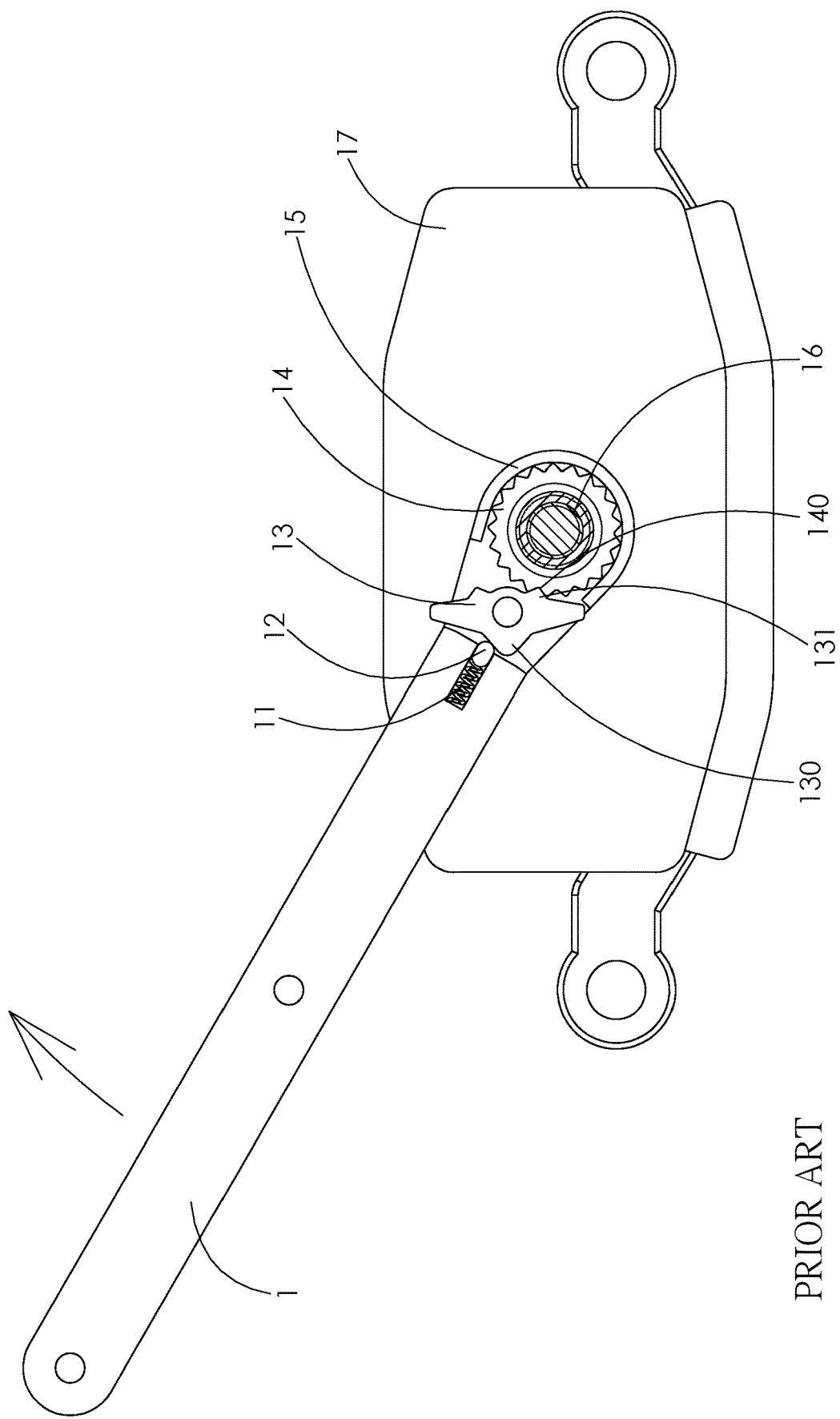
FIG. 1 is a schematic view showing the structure of a conventional tool.
Figure 2:
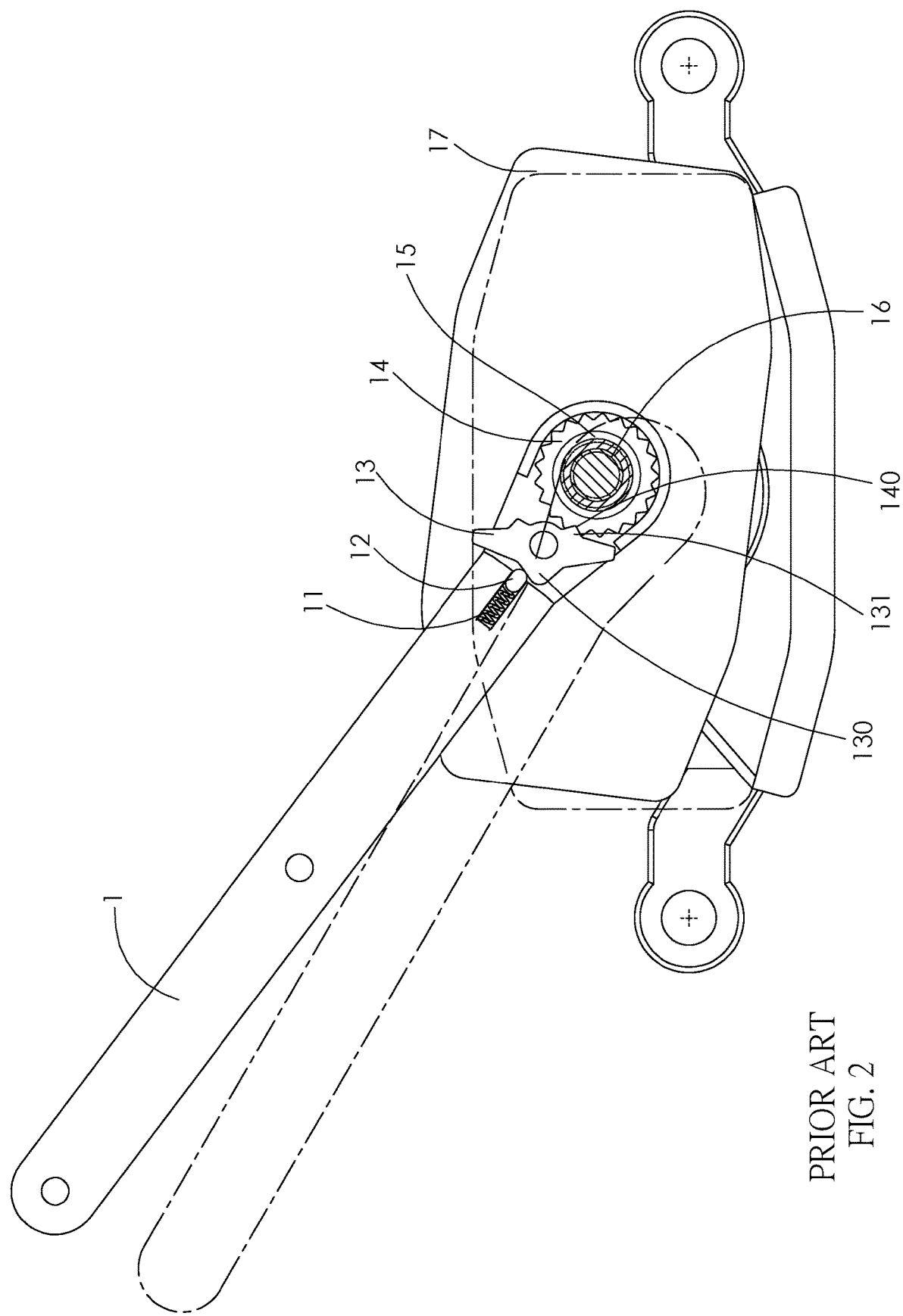
FIG. 2 is a schematic view of the conventional tool when in use.
Figure 3:
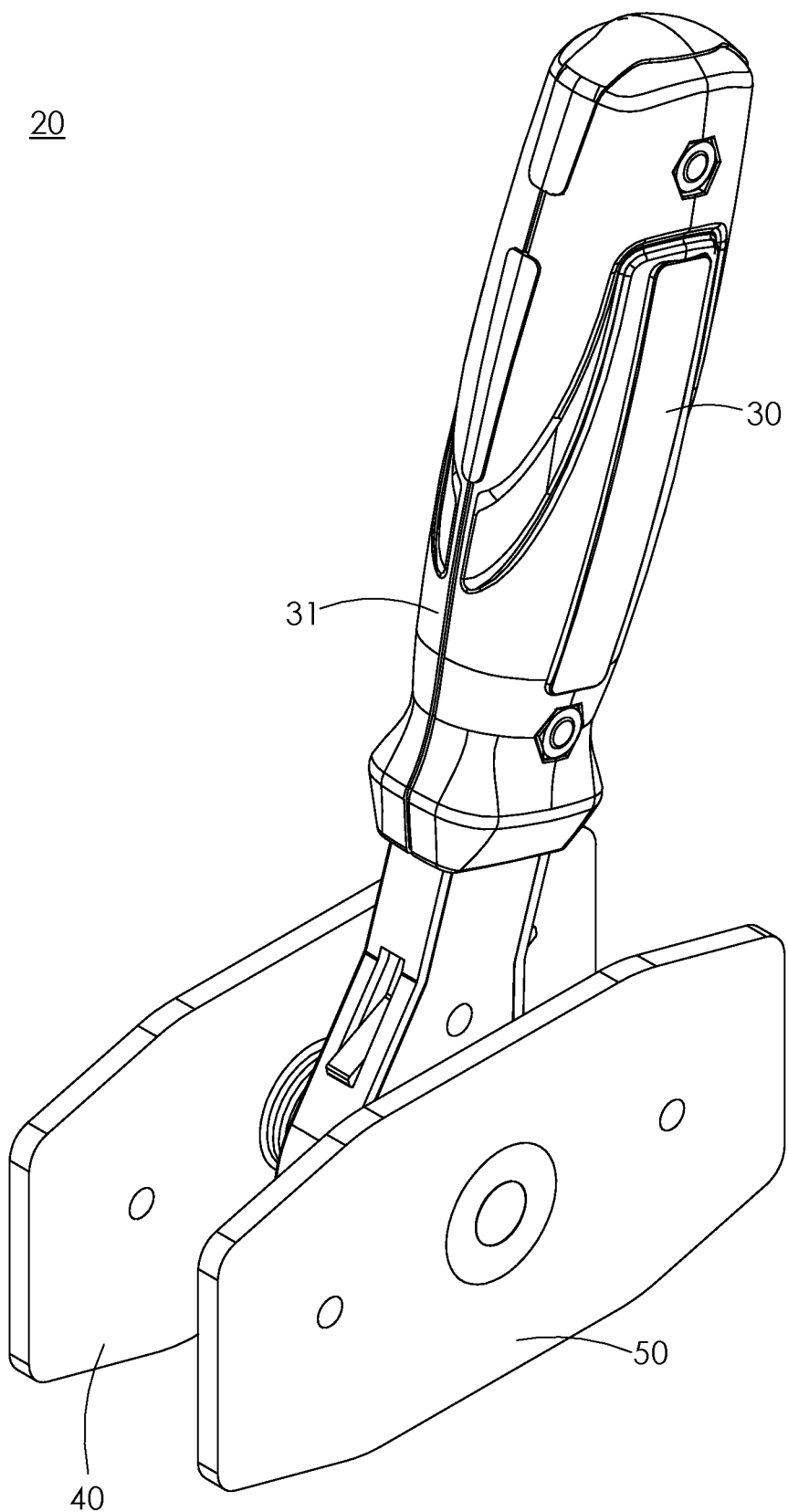
FIG. 3 is a perspective view of the invention.
Figure 4:
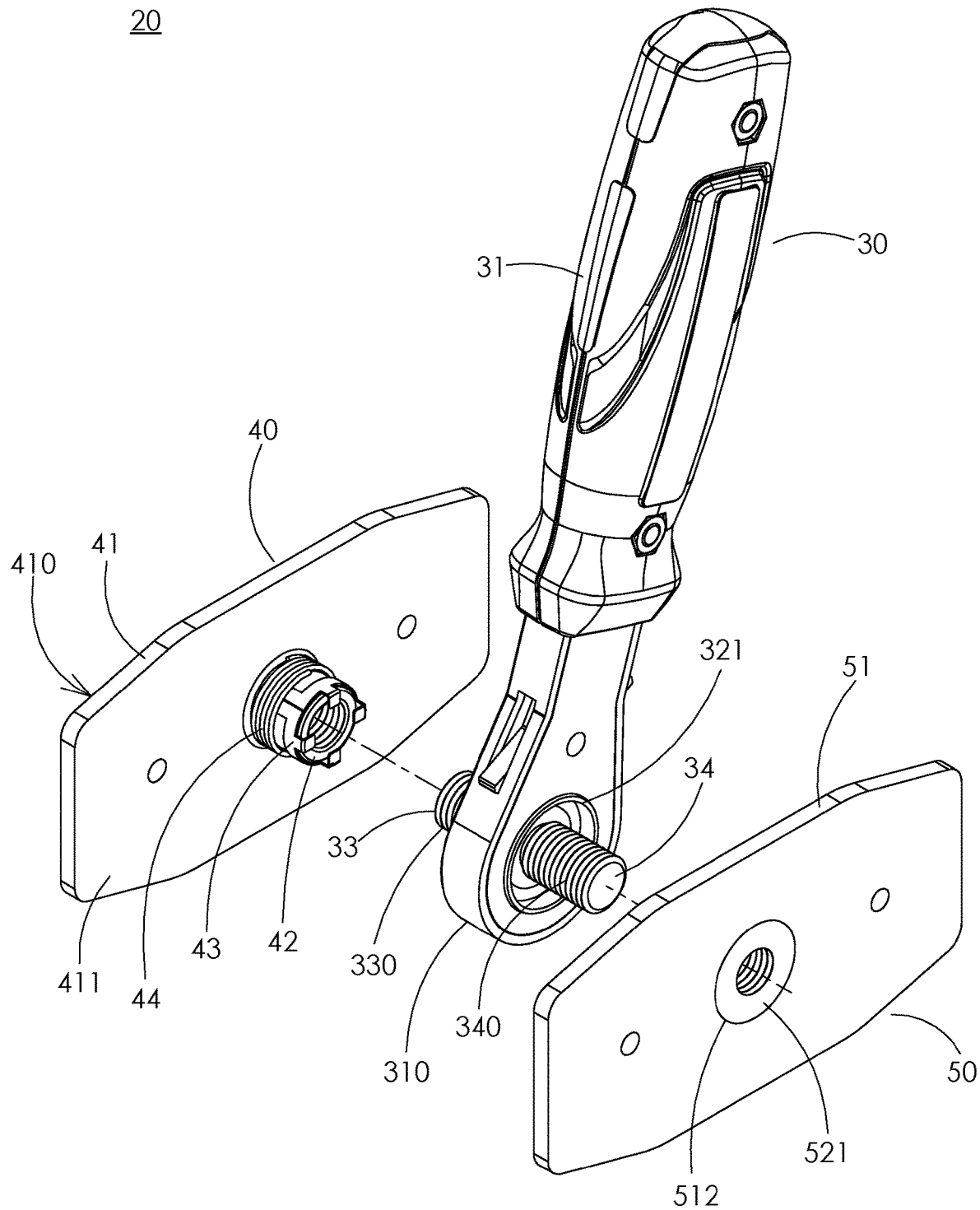
FIG. 4 is an exploded view of the invention.
Figure 5:
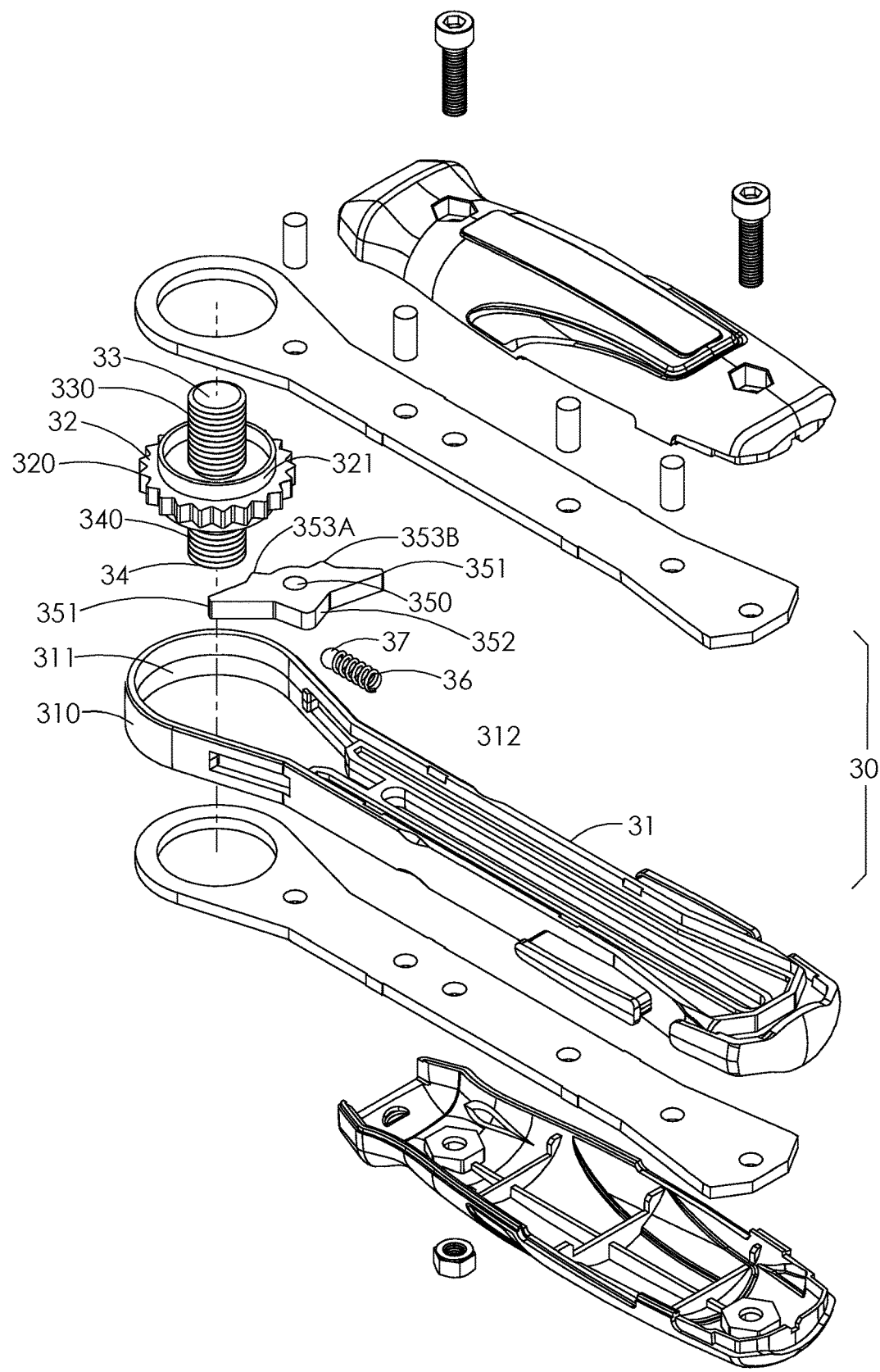
FIG. 5 is an exploded view of the reversible ratchet wrench of the invention.

The reversible ratchet wrench 30, as shown in FIG. 4 and FIG. 5 specifically, includes an operating handle 31 and a ratchet wheel 32 located at a force output end 310 of the operating handle 31. A first force output shaft 33 and a second force output shaft 34 are disposed on both sides of the center of the ratchet wheel 32 and extend out of both sides of the force output end 310 of the operating handle 31. The surface of the first force output shaft 33 is formed with a first external thread 330, and the surface of the second force output shaft 34 is formed with a second external thread 340. The first external thread 330 and the second external thread 340 are in different helical directions. Preferably, the first external thread 330 is a right-hand external thread, and the second external thread 340 is a left-hand external thread.

Figure 7:
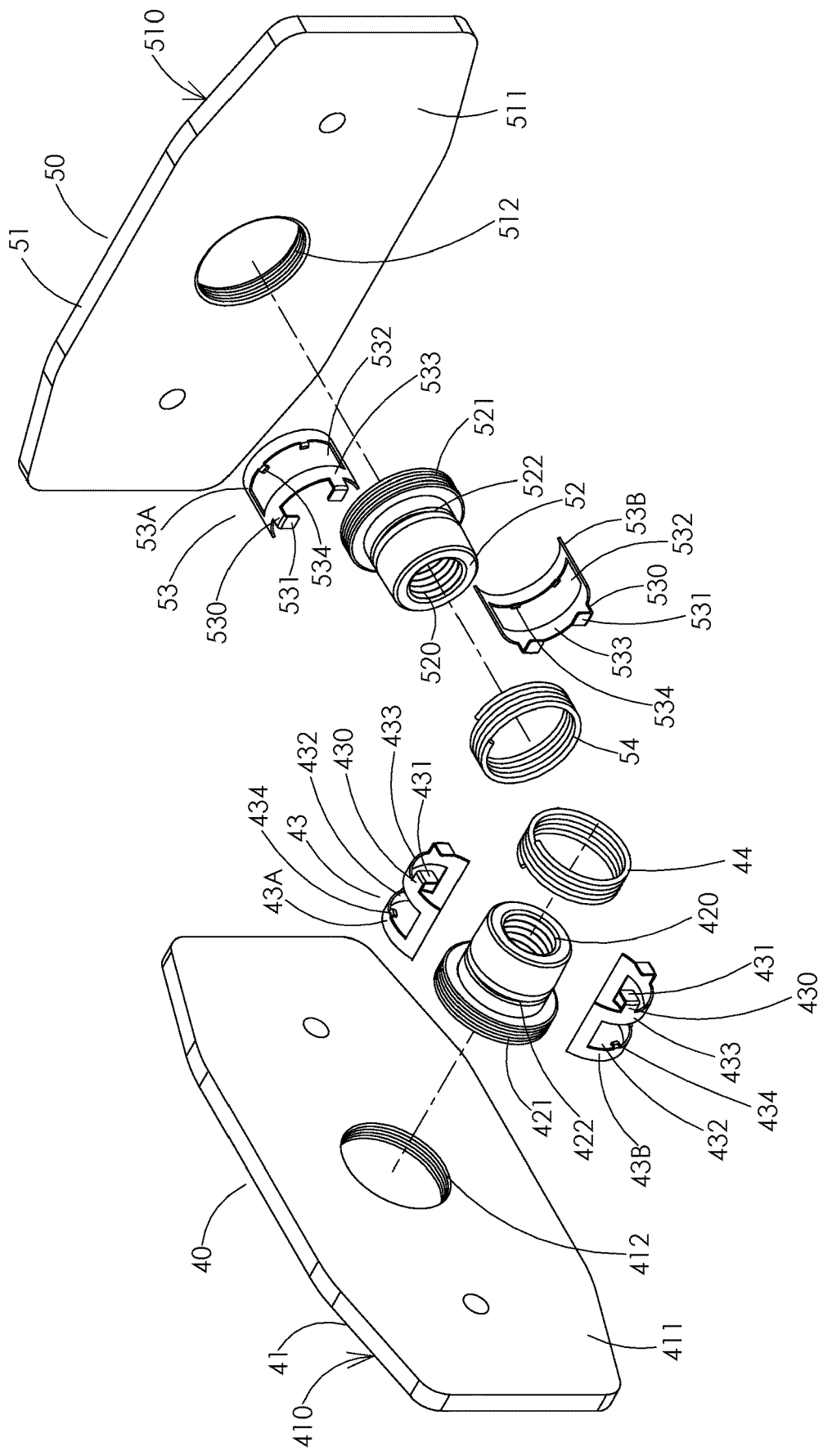
FIG. 7 is an exploded view of the first pressure plate assembly and the second pressure assembly of the invention.
Figure 8:
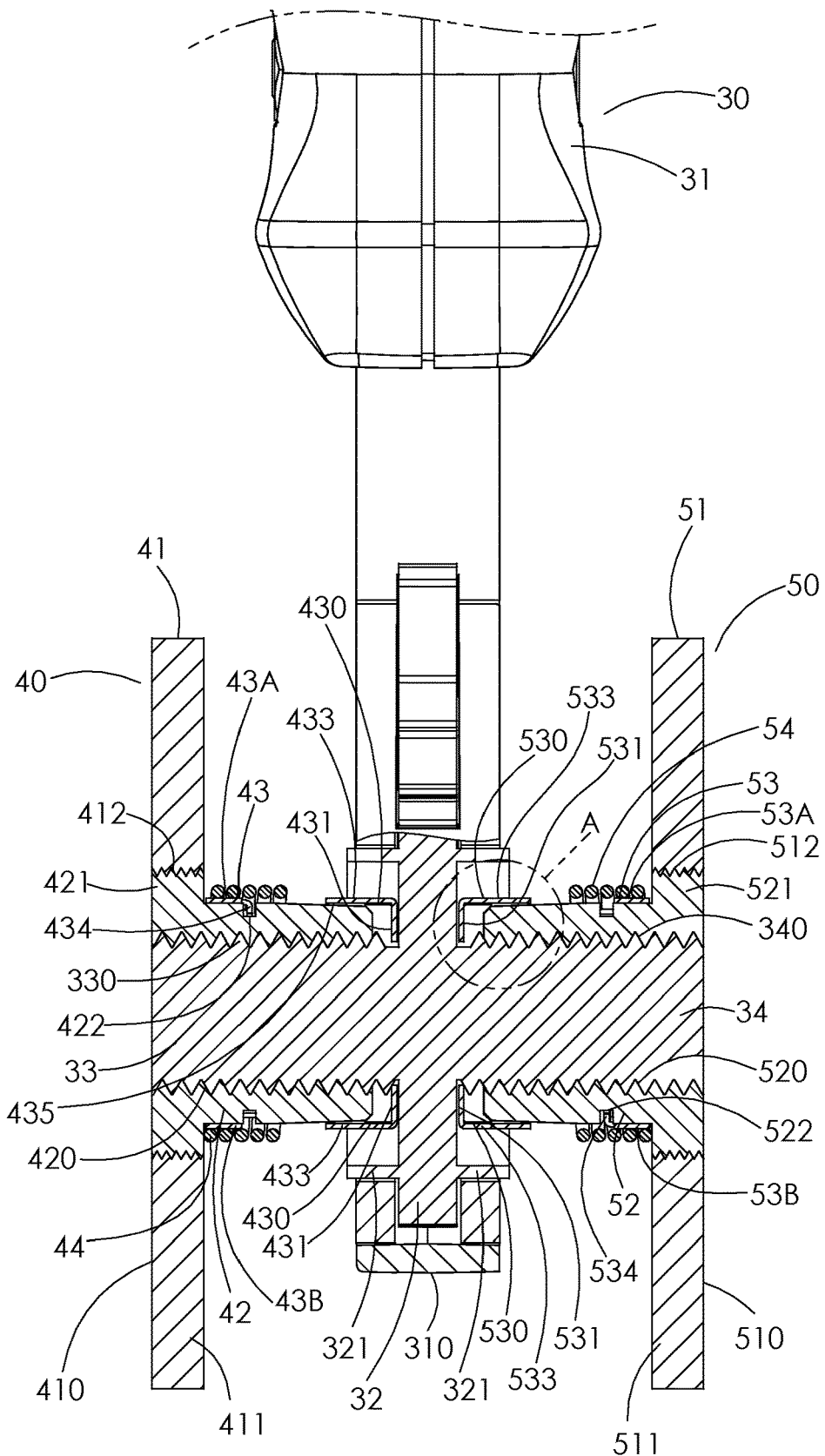
FIG. 8 is a cross-sectional view of the first pressure plate assembly and the second pressure assembly of the invention.
Figure 9:
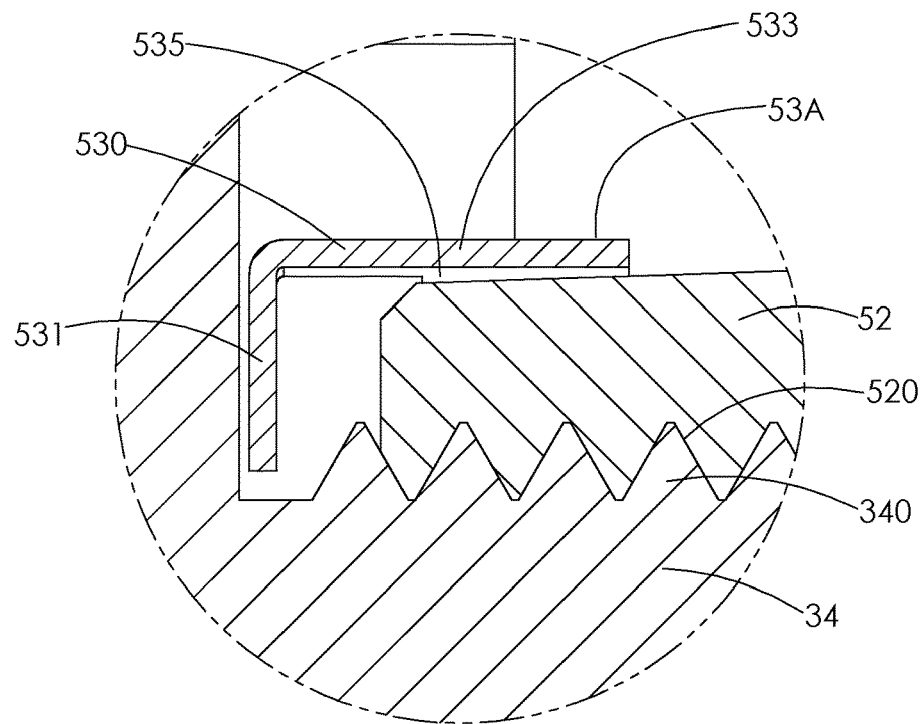
FIG. 9 is an enlarged view of circle A of FIG. 8.
Figure 10:
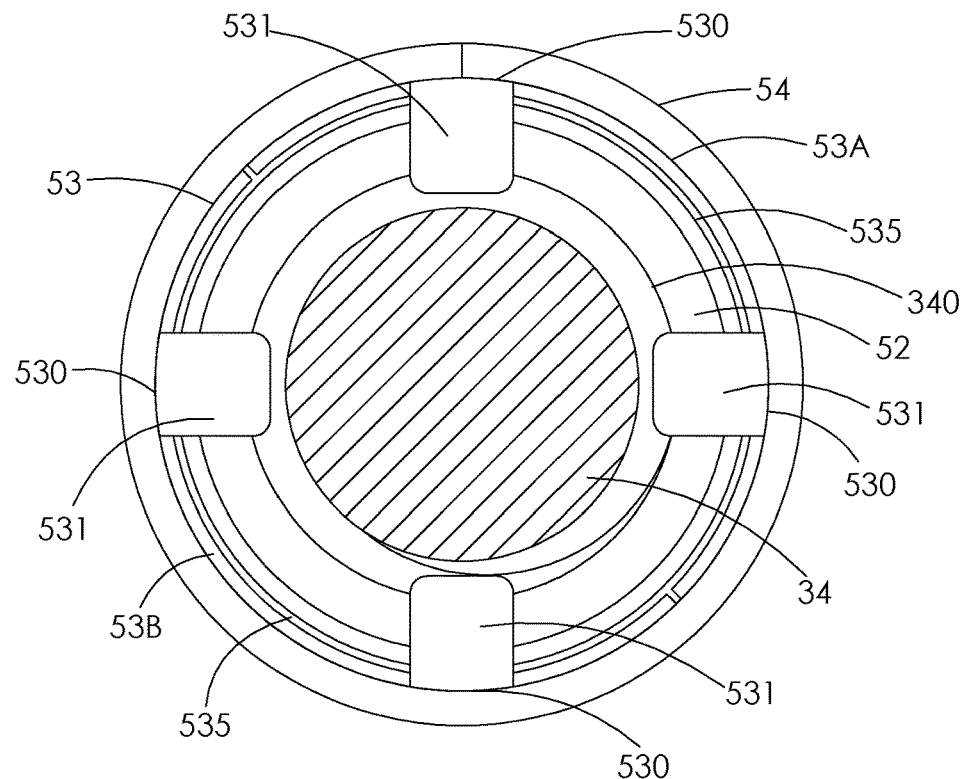
FIG. 10 is a schematic view illustrating the relationship between the first sleeve unit and the first external thread of the invention.

The first pressure plate assembly 40, as shown in FIG. 4, FIG. 7 and FIG. 8 specifically, includes a first pressure plate 41, a first nut 42, a first sleeve unit 43, and a first restraining member 44. The first pressure plate 41 has an outer surface 410 and an inner surface 411. The first nut 42 is fixed to the inner surface 411 of the first pressure plate 41 relative to the first force output shaft 33. The first nut 42 has a first internal screw hole 420 screwed with the first external thread 330. The first sleeve unit 43 is made of an elastic material, and is sleeved on the outer surface of the first nut 42. The front edge of one end of the first sleeve unit 43 has a plurality of first L-shaped elastic plates 430 that are arranged around the first internal screw hole 420 and extend toward the surface of the first force output shaft 33. The first L-shaped elastic plates 430 each have a first engaging piece 431 corresponding to the first external thread 330. The first engaging piece 431 is engagable in the root of the first external thread 330. The width of the first engaging piece 431 is not more than 4 times the pitch of the first external thread 330, and the thickness of the first engaging piece 431 is less than half of the pitch of the first external thread 330. The first engaging piece 431 is configured to jump along the first external thread 330 to generate a pressing force. The first restraining member 44 is sleeved on the surface of the first sleeve unit 43 for restraining the first sleeve unit 43 on the first nut 42.

The second pressure plate assembly 50 includes a second pressure plate 51, a second nut 52, a second sleeve unit 53, and a second restraining member 54. The second pressure plate 51 has an outer surface 510 and an inner surface 511. The second nut 52 is fixed to the inner surface 511 of the second pressure plate 51 relative to the second force output shaft 34. The second nut 52 has a second internal screw hole 520 screwed with the second external thread 340. The second sleeve unit 53 is made of an elastic material, and is sleeved on the outer surface of the second nut 52. The front edge of one end of the second sleeve unit 53 has a plurality of second L-shaped elastic plates 530 that are arranged around the second internal screw hole 520 and extend toward the surface of the second force output shaft 34. The second L-shaped elastic plates 530 each have a second engaging piece 531 corresponding to the second external thread 340. The second engaging piece 531 is engagable in the root of the second external thread 340. The width of the second engaging piece 531 is not more than 4 times the pitch of the second external thread 340, and the thickness of the second engaging piece 531 is less than half of the pitch of the second external thread 340. The second engaging piece 531 is configured to jump along the second external thread 340 to generate a pressing force. The second restraining member 54 is sleeved on the surface of the second sleeve unit 53 for restraining the second sleeve unit 53 on the second nut 52.

Figure 11:
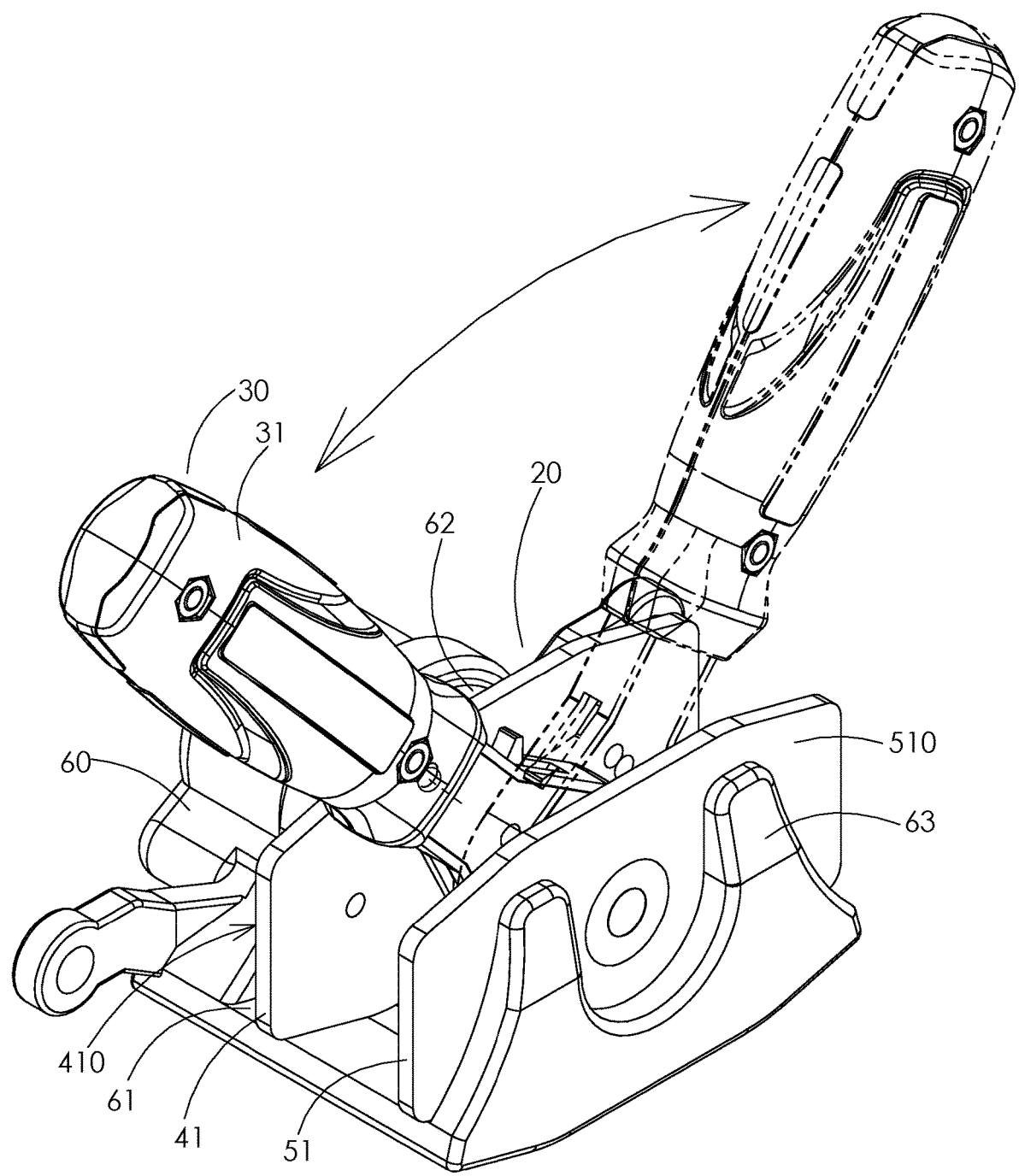
FIG. 11 is a schematic view of the invention when used in cooperation with the caliper housing.
Figure 12:
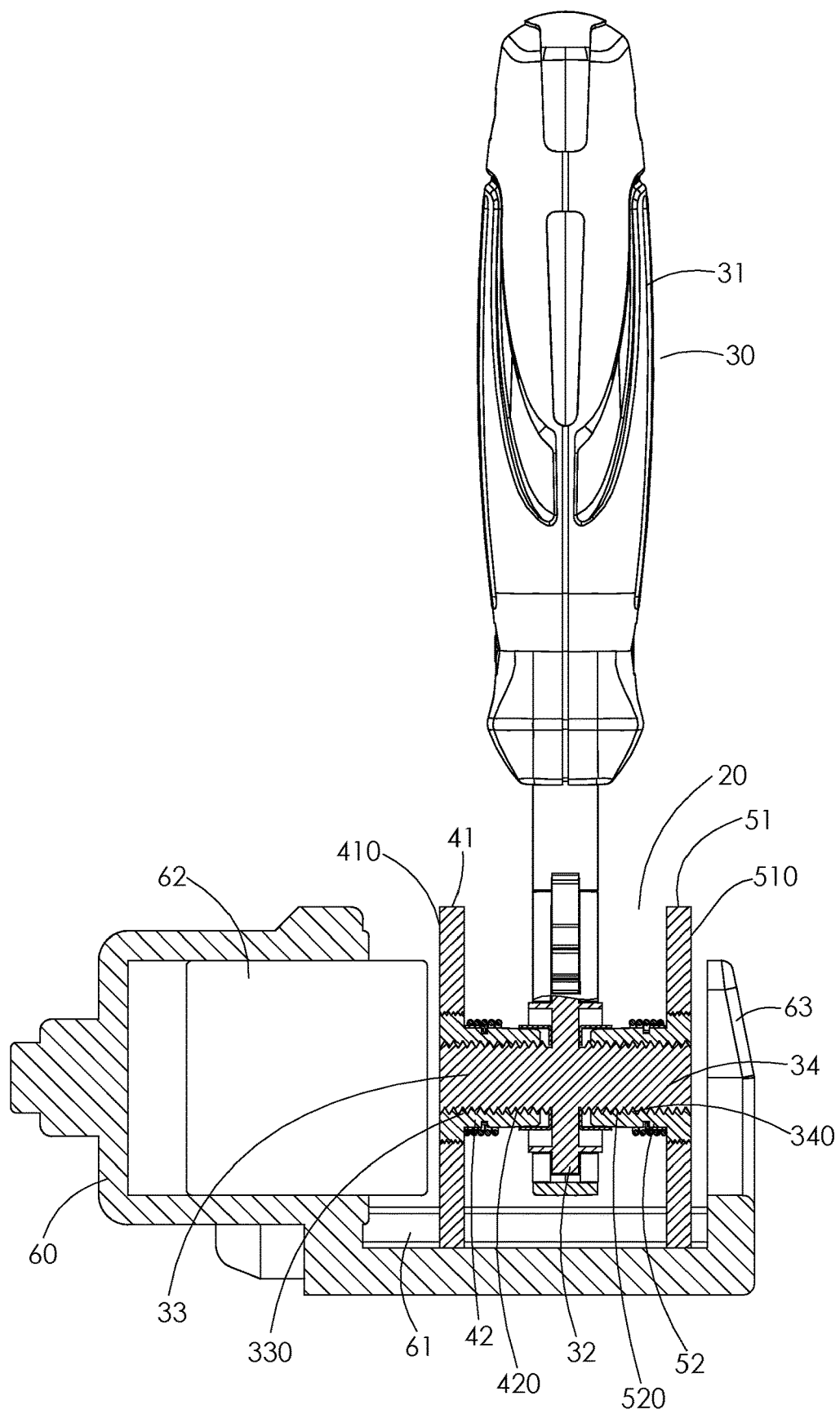
FIG. 12 is a cross-sectional view of the invention when used in cooperation with the caliper housing.
Figure 13:
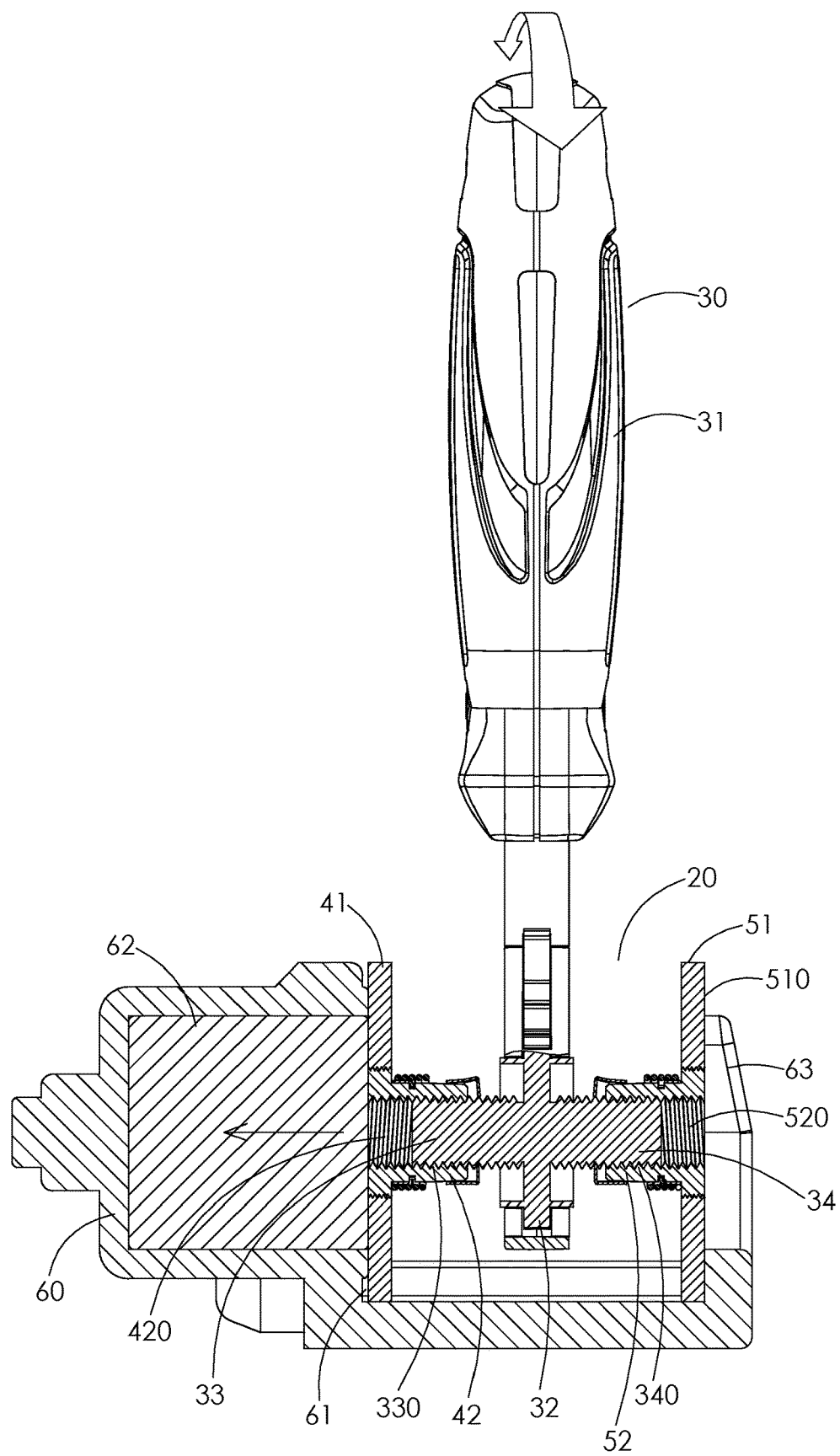
FIG. 13 is a schematic view of the invention when in use, showing that the piston of the caliper housing is pushed back.

As shown in FIG. 11, FIG. 12 and FIG. 13 specifically, when in use, the first pressure plate 41 and the second pressure plate 51 of the tool 20 are placed in an internal space 61 of a caliper housing 60 and located between at least one piston 62 that is not retracted and a fixed wall 63. The force output direction of the reversible ratchet wrench 30 is selective (for example, the counterclockwise force is selected). The operating handle 31 of the reversible ratchet wrench 30 is pulled back and forth, and then the ratchet wheel 32 (rotated counterclockwise) drives the first force output shaft 33 and the second force output shaft 34 to rotate in one direction (counterclockwise). The helical movements of the first external thread 330 (right-hand external thread) and the second external thread 340 (left-hand external thread) act on the first internal screw hole 420 of the non-rotating first nut 42 and the second inner screw hole 520 of the non-rotating second nut 52, such that the first pressure plate 41 and the second pressure plate 51 are driven to extend and move away from each other. The fixed wall 63 is configured to confine the movement of the first pressure plate 41 and the second pressure plate 51 and serves as a force support (the outer surface 510 of the second pressure plate 51 abuts against the fixed wall 63 to be supported), so that the piston 62 is retracted (by the outer surface 410 of the first pressure plate 41) to the starting position in the cylinder.

As shown in FIG. 15, FIG. 16, FIG. 17 and FIG. 18 specifically, in the process of retracting the piston 62, at least one of the first engaging pieces 431 of the first L-shaped elastic plates 430 of the first sleeve unit 43 and at least one of the second engaging pieces 531 of the second L-shaped elastic plates 530 of the second sleeve unit 53 are pressed against the first external thread 330 and the second external thread 340 to provide a damping force to limit rotation of the first force output shaft 33 and the second force output shaft 34. Thus, when the operating handle 31 of the reversible ratchet wrench 30 is pulled back, it will not drive the ratchet wheel 32, so that the tool 20 can be operated with one hand.

As shown in FIG. 14, FIG. 15, FIG. 16 and FIG. 17 specifically, when the operating handle 31 is operated, the helical movements of the first external thread 330 and the second external thread 340 drive the first pressure plate 41 and the second pressure plate 51 to extend and move away from each other. The first engaging pieces 431 of the first L-shaped elastic plates 430 and the second engaging pieces 531 of the second L-shaped elastic plates 530 are distributed in the roots and on the crests of the first external thread 330 and the second external thread 340. The helical movements of the first external thread 330 and the second external thread 340 don't interfere with each other because the first engaging pieces 431 of the first L-shaped elastic plates 430 and the second engaging pieces 531 of the second L-shaped elastic plates 530 are configured to jump along the first external thread 330 and the second external thread 340 independently. The helical movements of the first external thread 330 and the second external thread 340 won't be locked, which improves the drive reliability.

Figure 6:
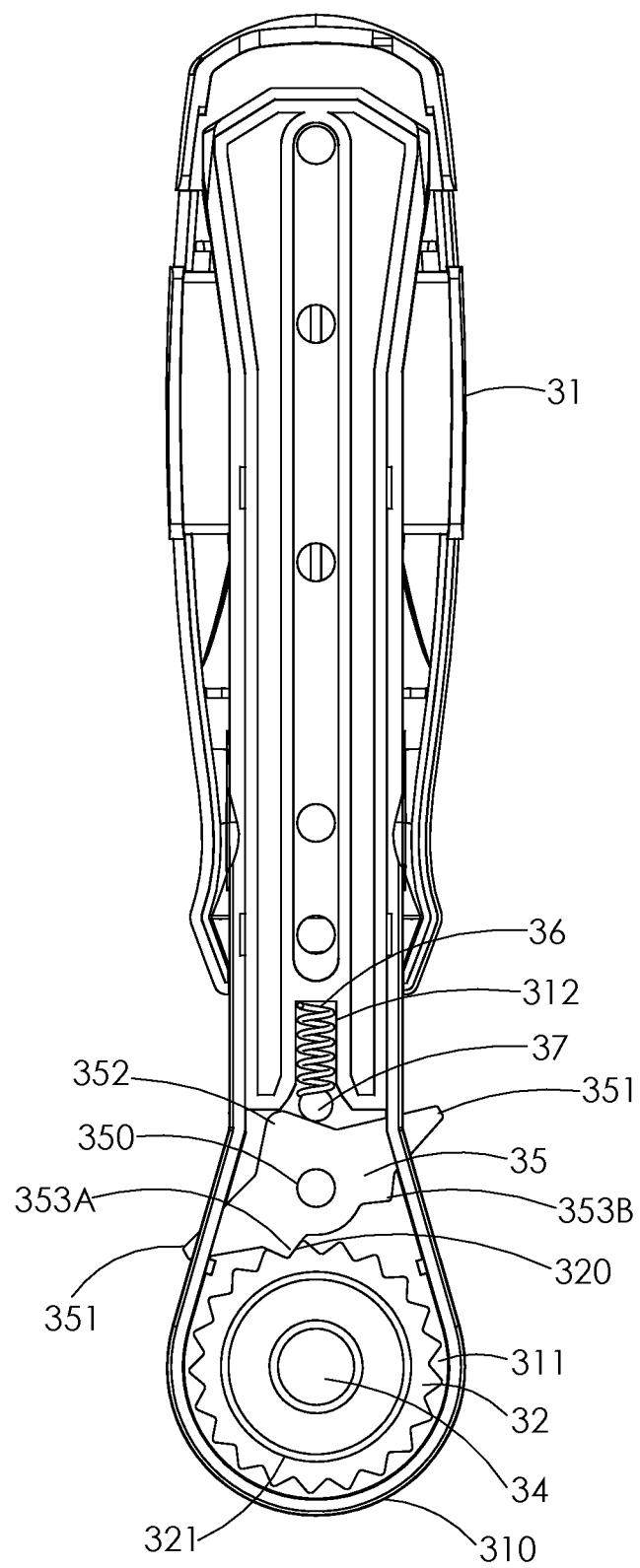
FIG. 6 is a schematic view of the reversible ratchet wrench of the invention, wherein the cover at one side is removed.

According to the above embodiment, as shown in FIG. 5 and FIG. 6 specifically, the force output end 30 of the operating handle 31 has an accommodating hole 311 therein. The ratchet wheel 32 and a pawl 35 are pivotally connected in the accommodating hole 311. The pawl 35 in the accommodating hole 311 is pivotally connected to the side edge of the ratchet wheel 32 via a pivot hole 350. The pawl 35 has a pair of switching portions 351 that are disposed at both ends of the pivot hole 350 and extend out of the accommodating hole 311. A nose-shaped protrusion 352 is formed on one side between the pair of switching portions 351. Two spaced claws 353A, 353B each corresponding in shape to a tooth space 320 of the ratchet wheel 32 are formed on the other side between the pair of switching portions 351. One side of the pawl 35 is provided with a spring 36 installed in a long groove 312 to push a stopper 36 (preferably a steel ball) against one side of the nose-shaped protrusion 352, so that one of the two claws 353A, 353B is engaged with the tooth space 320 of the ratchet wheel 32.

Figure 14:
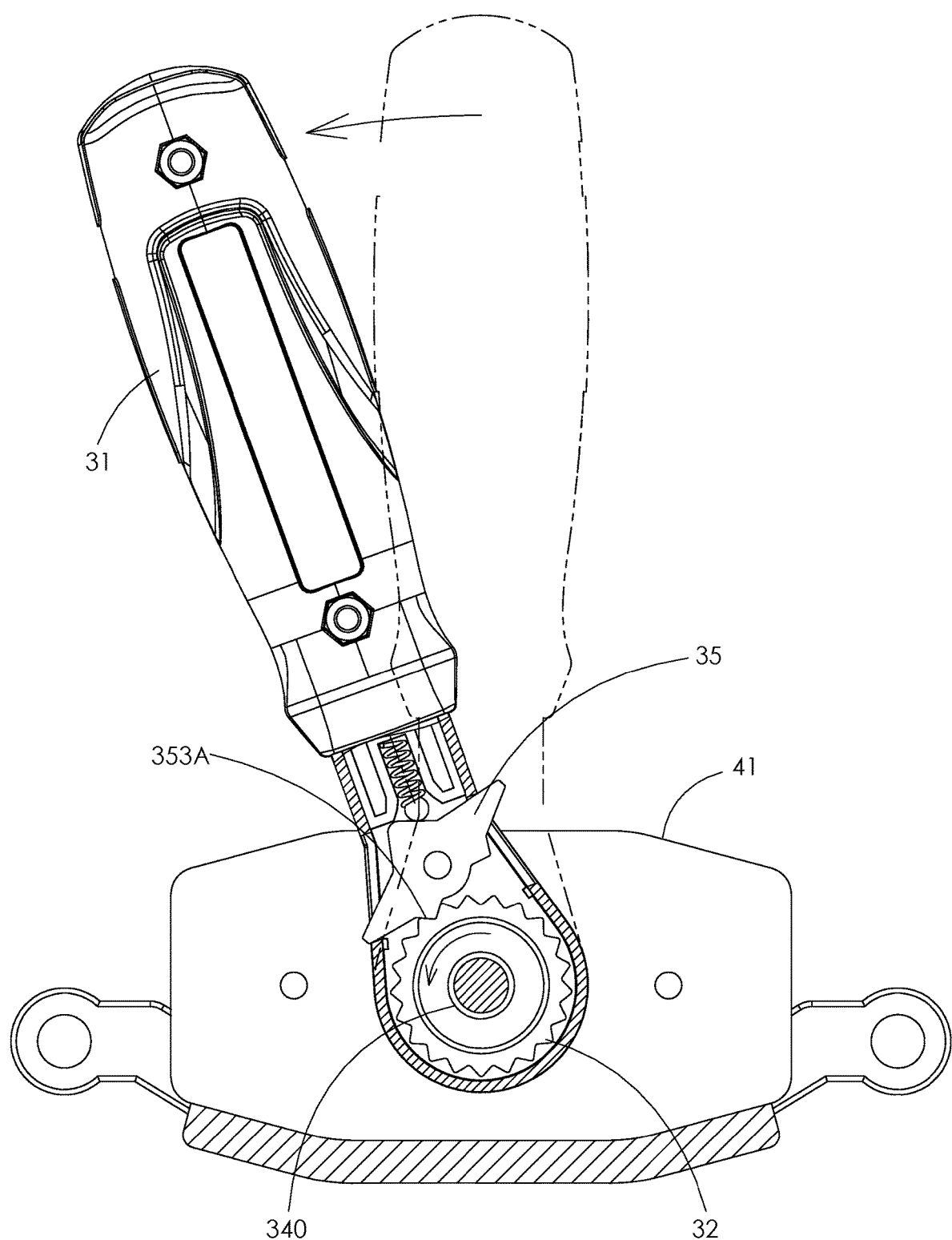
FIG. 14 is a schematic view showing the ratchet wheel of the reversible ratchet wrench in a transmission state of the invention.

As shown in FIG. 14 specifically, when the operating handle 31 is swung in one direction (counterclockwise), the claw 353A of the pawl 35 pushes the ratchet wheel 32 to rotate (counterclockwise). On the contrary, as shown in FIG. 8 specifically, when the operating handle 31 is swung back, the nose-shaped protrusion 352 presses the stopper 37 into the long groove 312, so that the claw 353A jumps on the teeth of the ratchet wheel 32 and won't push the ratchet wheel 32 to rotate reversely, thereby achieving the effect of unidirectional rotation of the ratchet wheel 32.

Figure 16:
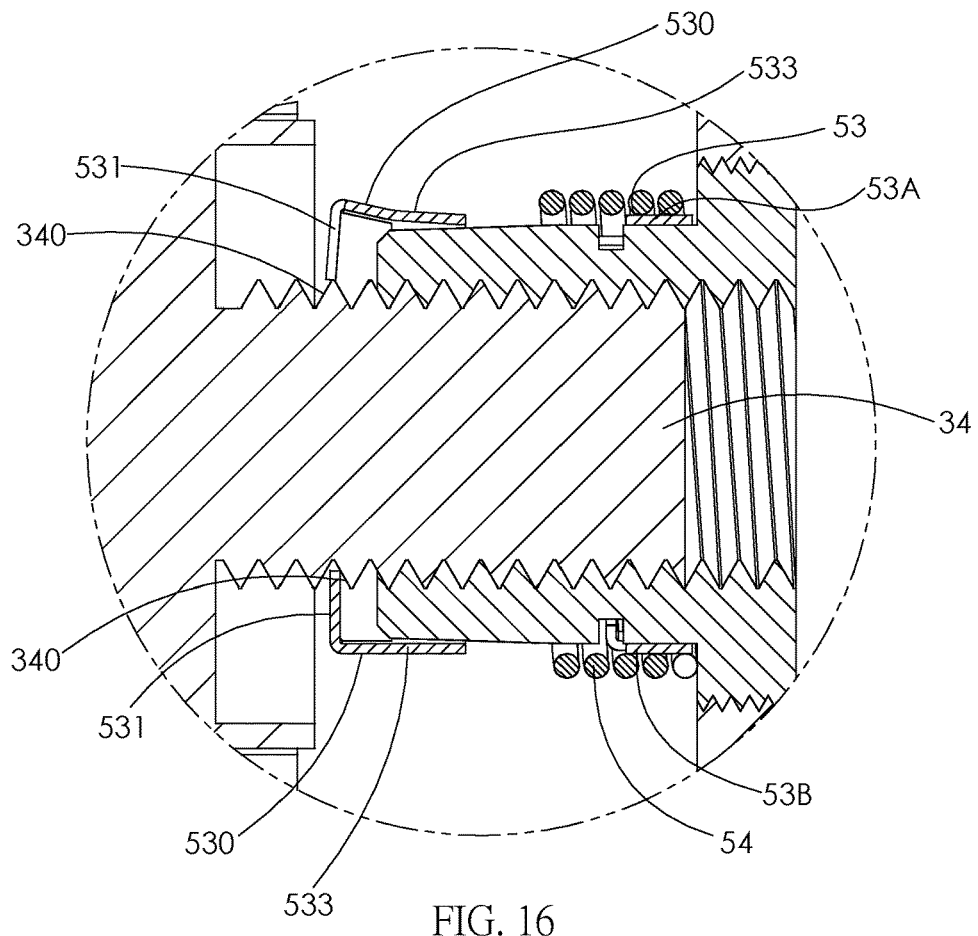
FIG. 16 is an enlarged view of circle B of FIG. 15.
Figure 17:
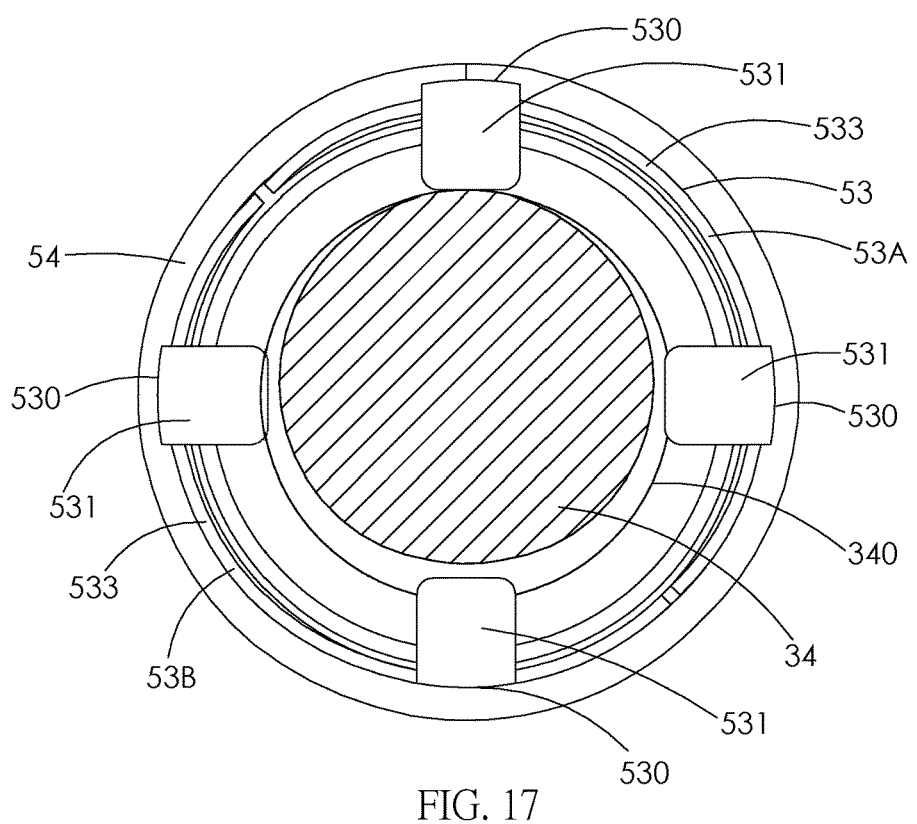
FIG. 17 is a schematic view illustrating the relationship between the first engaging piece and the first external thread of the invention when the operating handle is swung back and forth.
Figure 18:
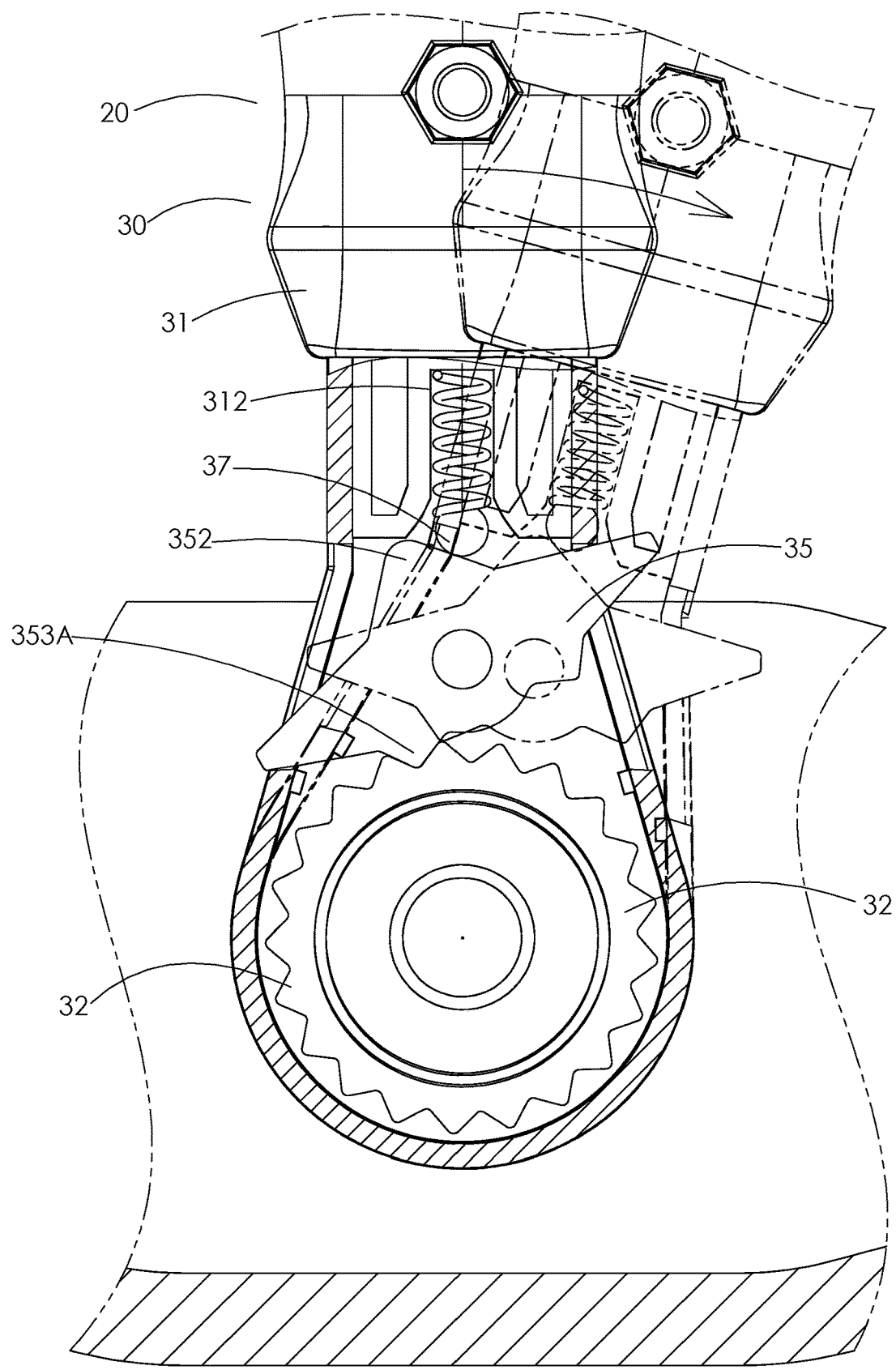
FIG. 18 is a schematic view showing the state of the reversible ratchet wrench of the invention when the ratchet wheel is restricted from rotating reversely.

As shown in FIG. 16, FIG. 17 and FIG. 18 specifically, when the operating handle 31 is swung back, the stopper 37 against the surface of the nose-shaped protrusion 352 of the pawl 35 is compressed and it has low resistance and rebounds back in height after being compressed, such that the first engaging pieces 431 of the first sleeve unit 43 and the second engaging pieces 531 of the second sleeve unit 53 are pressed against the first external thread 330 of the first force output shaft 33 and the second external thread 340 of the second force output shaft 34 to provide an anti-rotation effect. Thus, the ratchet wheel 32 won't be pushed to rotate reversely when the operating handle 31 is swung back.

According to the above embodiment, as shown in FIG. 4, FIG. 5 and FIG. 8 specifically, two sides of the ratchet wheel 32 are concentrically formed with circular frames 321. The two sides of the ratchet wheel 32 are pivoted to the force output end 310 of the operating handle 31 via the circular frames 321. The first force output shaft 33 and the second force output shaft 34 in the circular frames 321 extend from both sides of the ratchet wheel 32 to be out of the two sides of the force output end 310 of the operating handle 31. The first external thread 330 and the second external thread 340 are screwed with the first nut 42 and the second nut 52 respectively via the largest number of screw threads, so as to increase the effective distance of the helical movement.

According to the above embodiment, as shown in FIG. 4, FIG. 7 and FIG. 8 specifically, the first pressure plate 41 and the second pressure plate 51 each have a through screw hole 412, 512 relative to the first force output shaft 33 and the second force output shaft 34. The first nut 42 and the second nut 52 each have an annular coupling portion 421, 521 with an external thread relative to the through screw hole 412 of the first pressure plate 41 and the through screw hole 512 of the second pressure plate 51. The coupling portion 421 of the first nut 42 is screwed and fixedly connected to the through screw hole 412 of the first pressure plate 41 by using a hydraulic press machine, and the coupling portion 521 of the second nut 52 is screwed and fixedly connected to the through screw hole 512 of the second pressure plate 51 by using the hydraulic press machine. The first pressure plate 41 and the second pressure plate 51 can be concentrically, symmetrically extended away from each other or retracted toward each other.

According to the above embodiment, as shown in FIG. 7, FIG. 8, FIG. 9 and FIG. 10 specifically, the first nut 42 and the second nut 52 each have a cylindrical surface. Both the first restraining member 44 and the second restraining member 54 are elastically deformable compression springs. The first sleeve unit 43 is composed of a pair of first semicircular sleeves 43A, 43B that are spliced to each other and correspond in diameter and in shape to the first nut 42. The second sleeve unit 53 is composed of a pair of second semicircular sleeves 53A, 53B that are spliced to each other and correspond in diameter and in shape to the second nut 52. The pair of first semicircular sleeves 43A, 43B and the pair of second semicircular sleeves 53A, 53B each have at least one slot 432, 532 to form at least one elastic frame side 433, 533. The first L-shaped elastic plates 430 extend from the front edges of the elastic frame sides 433 of the pair of first semicircular sleeves 43A, 43B, respectively. The second L-shaped elastic plates 530 extend from the front edges of the elastic frame sides 533 of the pair of second semicircular sleeves 53A, 53B, respectively.

As shown in FIG. 7, FIG. 15, FIG. 16 and FIG. 17 specifically, the first restraining member 44 and the second restraining member 54 can be elastically expanded and deformed. The pair of first semicircular sleeves 43A, 43B and the pair of second semicircular sleeves 53A, 53B are deformed independently of each other, in cooperation with the elastic frame sides 433, 533 each having elastic deformation capacity. When the first external thread 330 and the second external thread 340 perform the helical movements, the first engaging pieces 431 of the first L-shaped elastic plates 430 and the second engaging pieces 531 of the second L-shaped elastic plates 530 react more quickly to the thrust of the helical movements to jump along the first and second external threads.

As shown in FIG. 7 and FIG. 8 specifically, the first nut 42 and the second nut 52 each have a groove 422, 522 around the surfaces of the first nut 42 and the second nut 52. The pair of first semicircular sleeves 43A, 43B and the pair of second semicircular sleeves 53A, 53B each have at least one locking piece 434, 534 to be locked in the groove 422, 522. Through the locking piece 434 to be locked in the groove 422, the pair of first semicircular sleeves 43A, 43B won't displace axially on the first nut 42. Through the locking piece 534 to be locked in the groove 522, the pair of second semicircular sleeves 53A, 53B won't displace axially on the second nut 52.

Figure 15:
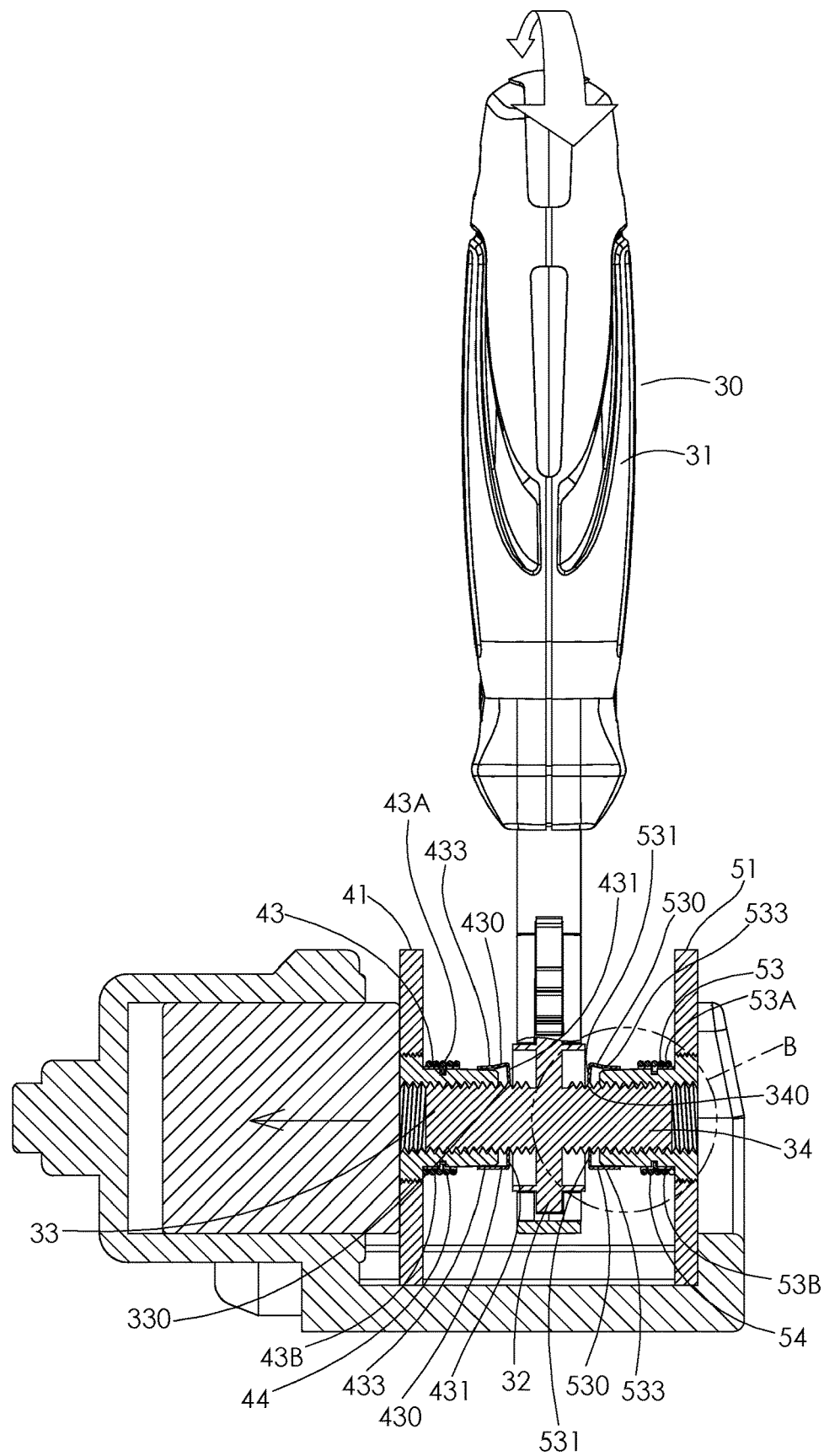
FIG. 15 is a cross-sectional view of the first pressure plate assembly and the second pressure assembly of the invention when the operating handle is swung back and forth.

As shown in FIG. 15 and FIG. 16 specifically, when the first engaging pieces 431 of the first L-shaped elastic plates 430 and the second engaging pieces 531 of the second L-shaped elastic plates 530 are pressed against the first external thread 330 and the second external thread 340 to bear the pushing forces of the helical movements, they can jump along the first external thread 330 and the second external thread 340, respectively.

Preferably, as shown in FIG. 7, FIG. 8, FIG. 9 and FIG. 10 specifically, the front section of each of the first nut 42 and the second nut 52 is gradually tapered, so that a gap 435, 535 is defined between the elastic frame sides 433 of the pair of first semicircular sleeves 43A, 43B and the front section of the first nut 42 as well as between the elastic frame sides 533 of the pair of second semicircular sleeves 53A, 53B and the front section of the second nut 52. Through the gap 435, 535, the first restraining member 44 is sleeved on part of the pair of first semicircular sleeves 43A, 43B without the gap 435, and the second restraining member 54 is sleeved on part of the pair of second semicircular sleeves 53A, 53B without the gap 535. This can prevent the elastic frame side 433, 533 from being bound or pressed to affect its deformation. Preferably, two first L-shaped elastic plates 430 extend from each of the front edges of the elastic frame sides 433 of the pair of first semicircular sleeves 43A, 43B, and two second L-shaped elastic plates 530 extend from each of the front edges of the elastic frame sides 533 of the pair of second semicircular sleeves 53A, 53B. The four first L-shaped elastic plates 430 are spaced apart from each other around the first force output shaft 33. Preferably, the four first L-shaped elastic plates 430 are spaced at equal intervals (approximately 90 degrees to each other) around the first force output shaft 33. The four second L-shaped elastic plates 530 are spaced apart from each other. Preferably, the four second L-shaped elastic plates 530 are spaced at equal intervals (approximately 90 degrees to each other) around the second force output shaft 34.

As shown in FIG. 15, FIG. 16 and FIG. 17 specifically, the first engaging pieces 431 of the four first L-shaped elastic plates 430 are distributed in different positions of the roots and the crests of the first external thread 330 in the helical movements. The second engaging pieces 531 of the four second L-shaped elastic plates 530 are distributed in different positions of the roots and the crests of the second external thread 340 in the helical movements. When the first external thread 330 and the second external thread 340 perform the helical movements, the first engaging pieces 431 and the second engaging pieces 531 react and bounce to pass through the crests of the first and second external threads at different timings, so that the helical movements won't be locked. When the operating handle 31 is swung back, the first force output shaft 33 and the second force output shaft 34 won't be driven to rotate.

According to the above embodiment, as shown in FIG. 7, FIG. 8, FIG. 9 and FIG. 10 specifically, the first external thread 330 and the second external thread 340 have the same pitch. The first engaging pieces 431 of the first L-shaped elastic plates 430 and the second engaging pieces 531 of the second L-shaped elastic plates 530 each correspond to the pitch and the depth of the first external thread 330 and the second external thread 340 and have a width that is 2 to 3 times the pitch and a thickness that is one quarter to one third of the pitch. The first engaging pieces 431 and the second engaging pieces 531 are square pieces and each have a bottom end extending downward about half to two-thirds of the depth of the first external thread 330 and the second external thread 340. By setting the size conditions of the first engaging pieces 431 and the second engaging pieces 531, as shown in FIG. 15 and FIG. 16 specifically, the first engaging pieces 431 and the second engaging pieces 531 will not be excessively twisted and deformed when pushed by the first and second external threads.

While the invention has been described in terms of preferred embodiments, those skilled in the art will recognize that the invention can be practiced with modifications within the spirit and scope of the appended claims.

What is claimed is:

1. A disc brake piston retraction tool, comprising:
   a reversible ratchet wrench including an operating handle and a ratchet wheel located at a force output end of the operating handle, a first force output shaft and a second force output shaft being disposed on two sides of a center of the ratchet wheel and extending out of two sides of the force output end of the operating handle, a surface of the first force output shaft being formed with a first external thread, a surface of the second force output shaft being formed with a second external thread, the first external thread and the second external thread being in different helical directions;
   a first pressure plate assembly including a first pressure plate, a first nut, a first sleeve unit, and a first restraining member; the first pressure plate having an outer surface and an inner surface; the first nut being fixed to the inner surface of the first pressure plate relative to the first force output shaft, the first nut having a first internal screw hole screwed with the first external thread; the first sleeve unit being made of an elastic material and sleeved on an outer surface of the first nut, a front edge of one end of the first sleeve unit having a plurality of first L-shaped elastic plates that are arranged around the first internal screw hole and extend toward the surface of the first force output shaft, the first L-shaped elastic plates each having a first engaging piece corresponding to the first external thread, the first engaging piece being engagable in a root of the first external thread, the first engaging piece having a width not more than 4 times a pitch of the first external thread, the first engaging piece having a thickness less than half of the pitch of the first external thread, the first engaging piece being configured to jump along the first external thread to generate a pressing force; the first restraining member being sleeved on a surface of the first sleeve unit for restraining the first sleeve unit on the first nut; and
   a second pressure plate assembly including a second pressure plate, a second nut, a second sleeve unit, and a second restraining member; the second pressure plate having an outer surface and an inner surface; the second nut being fixed to the inner surface of the second pressure plate relative to the second force output shaft, the second nut having a second internal screw hole screwed with the second external thread; the second sleeve unit being made of an elastic material and sleeved on an outer surface of the second nut, a front edge of one end of the second sleeve unit having a plurality of second L-shaped elastic plates that are arranged around the second internal screw hole and extend toward the surface of the second force output shaft, the second L-shaped elastic plates each having a second engaging piece corresponding to the second external thread, the second engaging piece being engagable in a root of the second external thread, the second engaging piece having a width not more than 4 times a pitch of the second external thread, the second engaging piece having a thickness less than half of the pitch of the second external thread, the second engaging piece being configured to jump along the second external thread to generate a pressing force, the second restraining member being sleeved on a surface of the second sleeve unit for restraining the second sleeve unit on the second nut.

2. The disc brake piston retraction tool of claim 1, wherein the force output end of the operating handle has an accommodating hole therein, the ratchet wheel and a pawl are pivotally connected in the accommodating hole, the pawl in the accommodating hole is pivotally connected to a side edge of the ratchet wheel via a pivot hole, the pawl has a pair of switching portions that are disposed at two ends of the pivot hole and extend out of the accommodating hole, a nose-shaped protrusion is formed on one side between the pair of switching portions, two spaced claws each corresponding in shape to a tooth space of the ratchet wheel are formed on another side between the pair of switching portions, and one side of the pawl is provided with a spring installed in a long groove to push a stopper against one side of the nose-shaped protrusion so that one of the two claws is engaged with the tooth space of the ratchet wheel.

3. The disc brake piston retraction tool of claim 1, wherein two sides of the ratchet wheel are concentrically formed with circular frames, and the two sides of the ratchet wheel are pivoted to the force output end of the operating handle via the circular frames.

4. The disc brake piston retraction tool of claim 1, wherein the first pressure plate and the second pressure plate each have a through screw hole relative to the first force output shaft and the second force output shaft, the first nut and the second nut each have an annular coupling portion with an external thread relative to the through screw hole of the first pressure plate and the through screw hole of the second pressure plate, the coupling portion of the first nut is screwed and fixedly connected to the through screw hole of the first pressure plate by using a hydraulic press machine, and the coupling portion of the second nut is screwed and fixedly connected to the through screw hole of the second pressure plate by using the hydraulic press machine.

5. The disc brake piston retraction tool of claim 1, wherein the first nut and the second nut each have a cylindrical surface; the first restraining member and the second restraining member are elastically deformable compression springs, the first sleeve unit is composed of a pair of first semicircular sleeves that are spliced to each other and correspond in diameter and in shape to the first nut, the second sleeve unit is composed of a pair of second semicircular sleeves that are spliced to each other and correspond in diameter and in shape to the second nut, the pair of first semicircular sleeves and the pair of second semicircular sleeves each have at least one slot to form at least one elastic frame side, the first L-shaped elastic plates extend from front edges of the elastic frame sides of the pair of first semicircular sleeves respectively, and the second L-shaped elastic plates extend from front edges of the elastic frame sides of the pair of second semicircular sleeves, respectively.

6. The disc brake piston retraction tool of claim 5, wherein the first nut and the second nut each have a groove around the surfaces of the first nut and the second nut, and the pair of first semicircular sleeves and the pair of second semicircular sleeves each have at least one locking piece to be locked in the groove.

7. The disc brake piston retraction tool of claim 5, wherein a front section of each of the first nut and the second nut is gradually tapered, so that a gap is defined between the elastic frame sides of the pair of first semicircular sleeves and the front section of the first nut as well as between the elastic frame sides of the pair of second semicircular sleeves and the front section of the second nut.

8. The disc brake piston retraction tool of claim 5, wherein two said first L-shaped elastic plates extend from each of the front edges of the elastic frame sides of the pair of first semicircular sleeves, two said second L-shaped elastic plates extend from each of the front edges of the elastic frame sides of the pair of second semicircular sleeves, the four first L-shaped elastic plates are spaced apart from each other around the first force output shaft, and the four second L-shaped elastic plates are spaced apart from each other around the second force output shaft.

9. The disc brake piston retraction tool of claim 8, wherein two said first L-shaped elastic plates extend from each of the front edges of the elastic frame sides of the pair of first semicircular sleeves, two said second L-shaped elastic plates extend from each of the front edges of the elastic frame sides of the pair of second semicircular sleeves, the four first L-shaped elastic plates are spaced at equal intervals around the first force output shaft, and the four second L-shaped elastic plates are spaced at equal intervals around the second force output shaft.

10. The disc brake piston retraction tool of claim 1, wherein the first external thread and the second external thread have the same pitch, the first engaging pieces of the first L-shaped elastic plates and the second engaging pieces of the second L-shaped elastic plates each correspond to the pitch and a depth of the first external thread and the second external thread respectively and have a width that is 2 to 3 times the pitch and a thickness that is one quarter to one third of the pitch, the first engaging pieces and the second engaging pieces are square pieces and each have a bottom end extending downward about half to two-thirds of the depth of the first external thread and the second external thread.

* * * * *